US012752530B2

(12) United States Patent
Tozuka et al.

(10) Patent No.: US 12,752,530 B2
(45) Date of Patent: Oct. 6, 2026

(54) LIQUID DISCHARGE HEAD AND LIQUID DISCHARGE DEVICE

(71) Applicant: RISO Technologies Corporation, Tokyo (JP)

(72) Inventors: Takashi Tozuka, Sunto Shizuoka (JP); Masato Fukasawa, Fuji Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 156 days.

(21) Appl. No.: 18/443,100

(22) Filed: Feb. 15, 2024

(65) Prior Publication Data

US 2024/0416652 A1 Dec. 19, 2024

(30) Foreign Application Priority Data

Jun. 16, 2023 (JP) ................................ 2023-099408

(51) Int. Cl.
*B41J 2/14* (2006.01)

(52) U.S. Cl.
CPC .. *B41J 2/14201* (2013.01); *B41J 2002/14459* (2013.01)

(58) Field of Classification Search
CPC .......... B41J 2/14201; B41J 2002/14459; B41J 2/14233; B41J 2/14; B41J 2/1433; B41J 2002/14483
See application file for complete search history.

(56) References Cited

U.S. PATENT DOCUMENTS 9,144,967 B2 * 9/2015 Kobayashi ........... B41J 2/14209

FOREIGN PATENT DOCUMENTS

| | | | |
|---|---|---|---|
| EP | 4186703 A1 | | 5/2023 |
| JP | 2010012756 A | * | 1/2010 |
| JP | 2015189031 A | | 11/2015 |

OTHER PUBLICATIONS

Miura, "Liquid-Droplet Discharge Head, Ink Cartridge, and Image Forming Device" (JP 2010012756 A), Jan. 21, 2010, [Abstract and Best-Mode, see Figs. 1, 7, 9, and 10] (Year: 2010).*

* cited by examiner

*Primary Examiner* — Lisa Solomon
(74) *Attorney, Agent, or Firm* — Kim & Stewart LLP

(57) ABSTRACT

According to an embodiment, a liquid discharge head includes a base plate having an elongated hole therein. The elongated hole extends lengthwise in a first direction and laterally in a second direction perpendicular to the first direction. A corner portion of the elongated hole that is near an end of the elongated hole in the first direction is rounded or the end is semicircular. A piezoelectric actuator is on the base plate at a position adjacent to the elongated hole in the second direction. The piezoelectric actuator includes a plurality of pressure chambers disposed along the first direction.

13 Claims, 11 Drawing Sheets

LIQUID DISCHARGE HEAD AND LIQUID DISCHARGE DEVICE

CROSS-REFERENCE TO RELATED APPLICATION

This application is based upon and claims the benefit of priority from Japanese Patent Application No. 2023-099408, filed Jun. 16, 2023, the entire contents of which are incorporated herein by reference.

FIELD

Embodiments described herein relate generally to a liquid discharge head and a liquid discharge device.

BACKGROUND

In recent years, higher productivity has been required from liquid discharge heads such as those in inkjet printers. It has become essential to increase the speed and amount of liquid droplets ejected. A shear mode, shared-wall type inkjet head that discharges ink is a known type of liquid discharge head. In such an inkjet head, a shear mode by which a large volume displacement can be obtained is used, and since rigidity of the pressure chamber formed by a piezoelectric material can also be high, the inkjet head has high power for ejection, and is thus suitable for discharge of high-viscosity inks and/or large droplets. However, in this inkjet head type, since drive columns are shared by two adjacent pressure chambers, the inkjet head must be based on a so-called three-cycle drive in which only one third of the pressure chambers can be driven simultaneously at any one time.

An independent drive structure for an inkjet head is known. In such a structure, a large number of grooves are formed in a piezoelectric body, and every other groove is closed off at its inlet and outlet by a photosensitive resin. The grooves that are not closed off in this manner are used as a pressure chamber, but the closed off grooves are used as inactive air chambers (dummy chambers).

In the base plate of such a type of inkjet head, ink is mainly supplied by arranging a plurality of holes. In recently developed printers in which high-speed printing with high productivity is required, there is a concern that ink supply for such a structure cannot meet the requirements, and there is thus a need for large-capacity and high-speed ink supply. It is possible that the shape of an ink supply hole can be a rectangular shape long in one direction. However, if such ink supply hole design is used, there is a potential problem that the base plate is likely to be damaged when a force is applied from the outside.

DETAILED DESCRIPTION

In general, according to one embodiment, a liquid discharge head and a liquid discharge device avoiding damage to a base plate component are described.

According to an embodiment, a liquid discharge head includes a base plate having an elongated hole therein. The elongated hole extends lengthwise in a first direction and laterally in a second direction perpendicular to the first direction. A corner portion of the elongated hole that is near an end of the elongated hole in the first direction is rounded. A piezoelectric actuator is on the base plate at a position adjacent to the elongated hole in the second direction. The piezoelectric actuator includes a plurality of pressure chambers disposed along the first direction.

Figure 1:
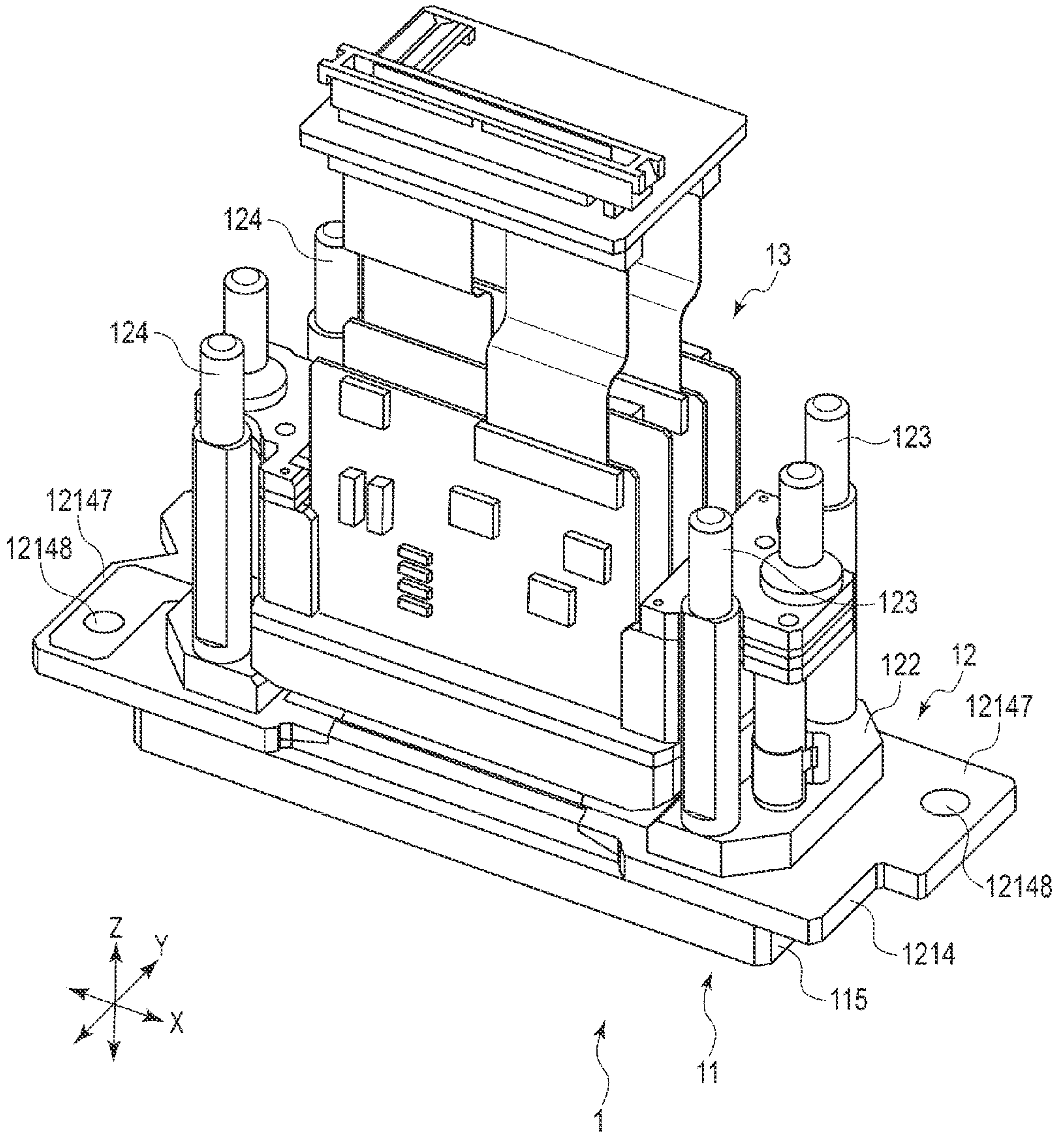
FIG. 1 depicts a liquid discharge head according to an embodiment.
Figure 2:
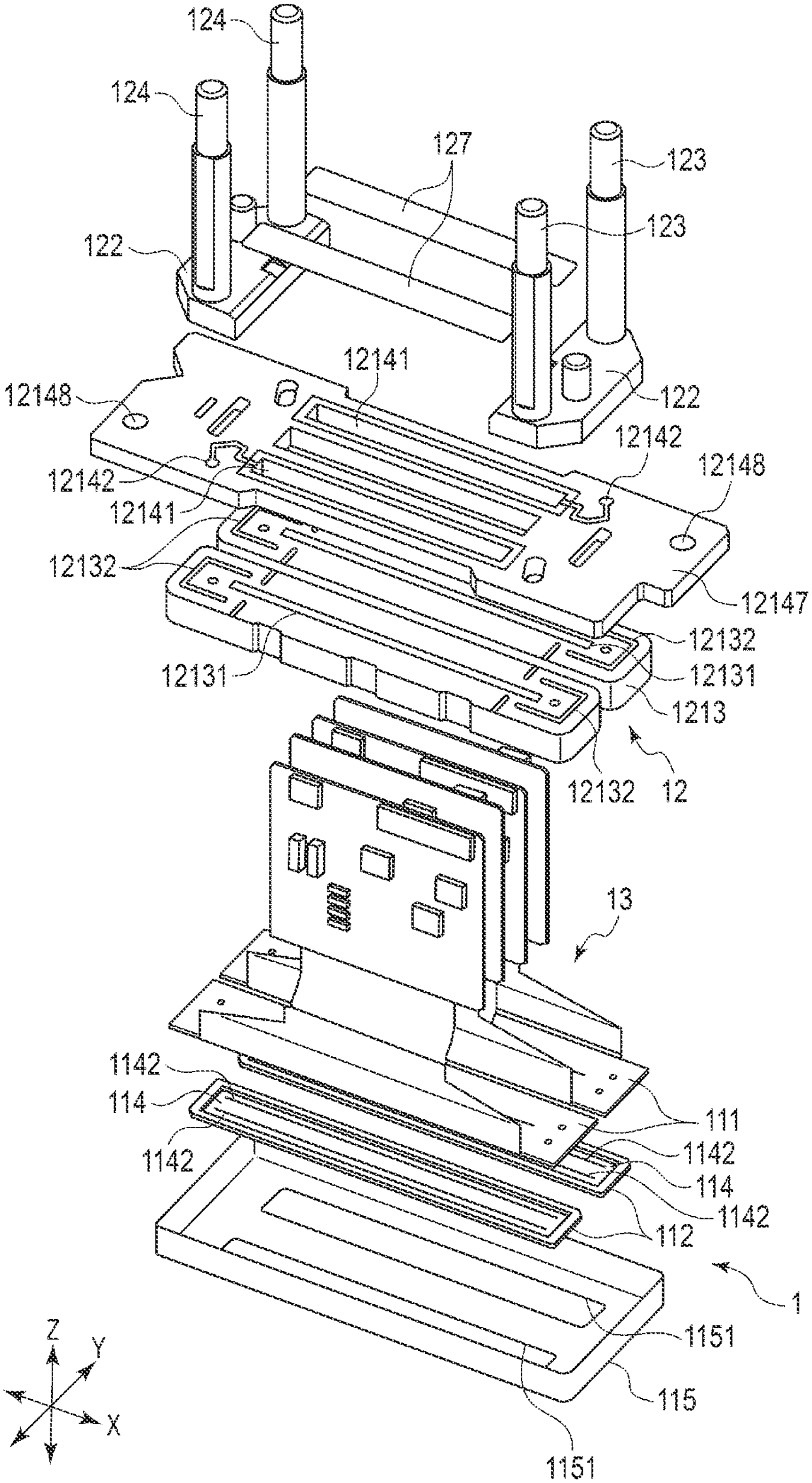
FIG. 2 is an exploded perspective view depicting a liquid discharge head according to an embodiment.
Figure 3:
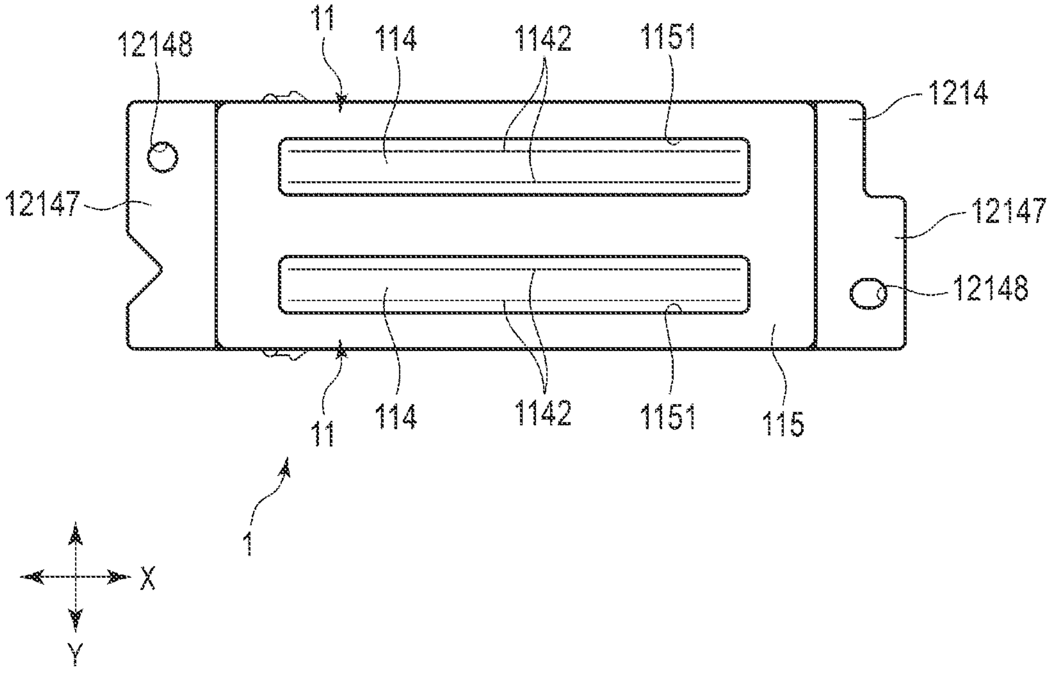
FIG. 3 is a bottom view depicting a liquid discharge head according to an embodiment.

Hereinafter, a liquid discharge head 1 and a liquid discharge device 2 incorporating the liquid discharge head 1 will be described with reference to the figures. FIG. 1 is a perspective view showing a configuration of a liquid discharge head 1 according to an embodiment. FIG. 2 is an exploded perspective view showing aspects of the liquid discharge head 1. FIG. 3 is a bottom view showing aspects the liquid discharge head 1.

Figure 4:
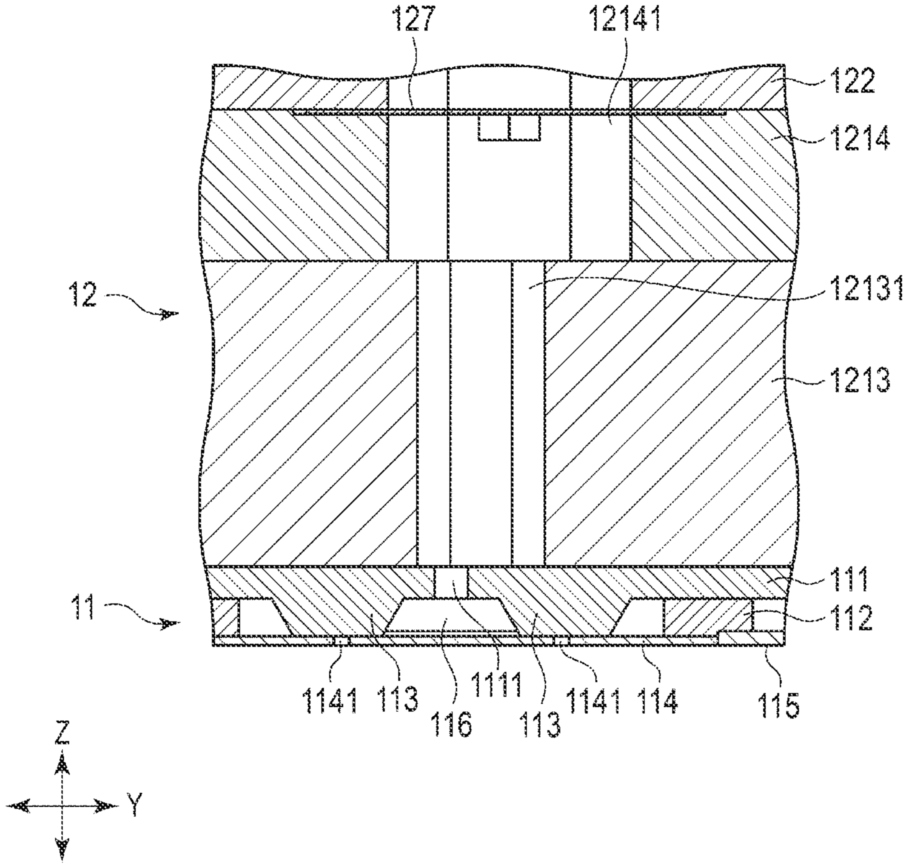
FIG. 4 is an enlarged cross-sectional view of a head body and a manifold unit.
Figure 5:
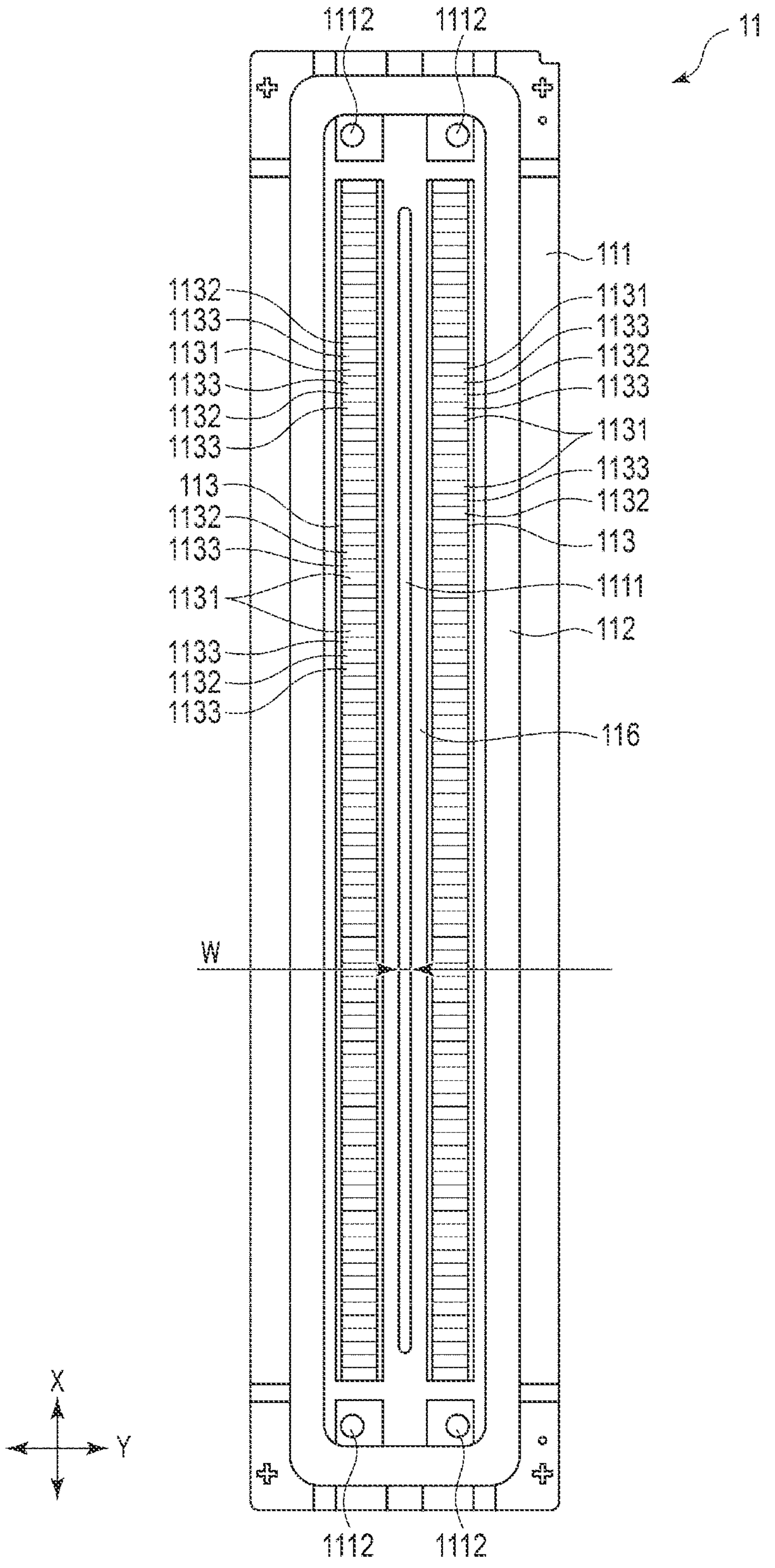
FIG. 5 is a bottom view of a head body with a part thereof omitted.
Figure 6:
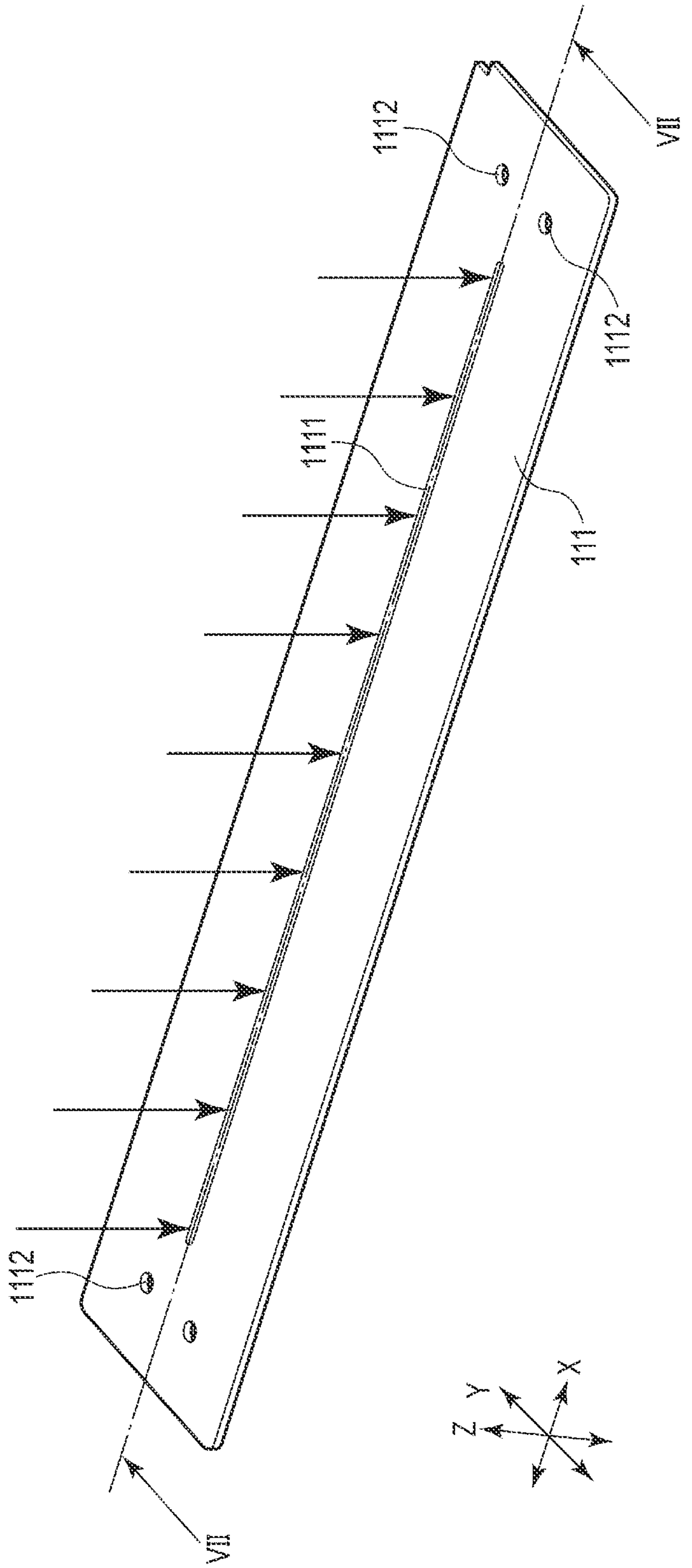
FIG. 6 is a perspective view of a base plate.
Figure 7:
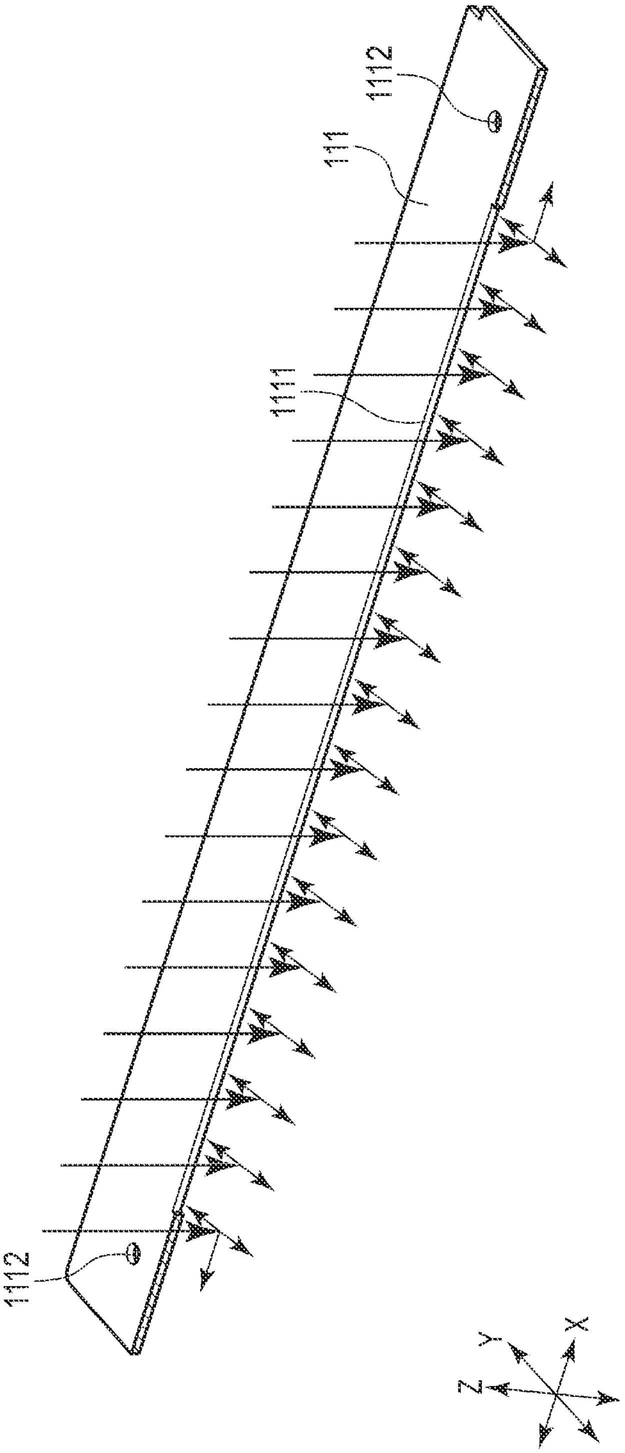
FIG. 7 depicts a cross section along a line VII-VII in FIG. 6.
Figure 8:
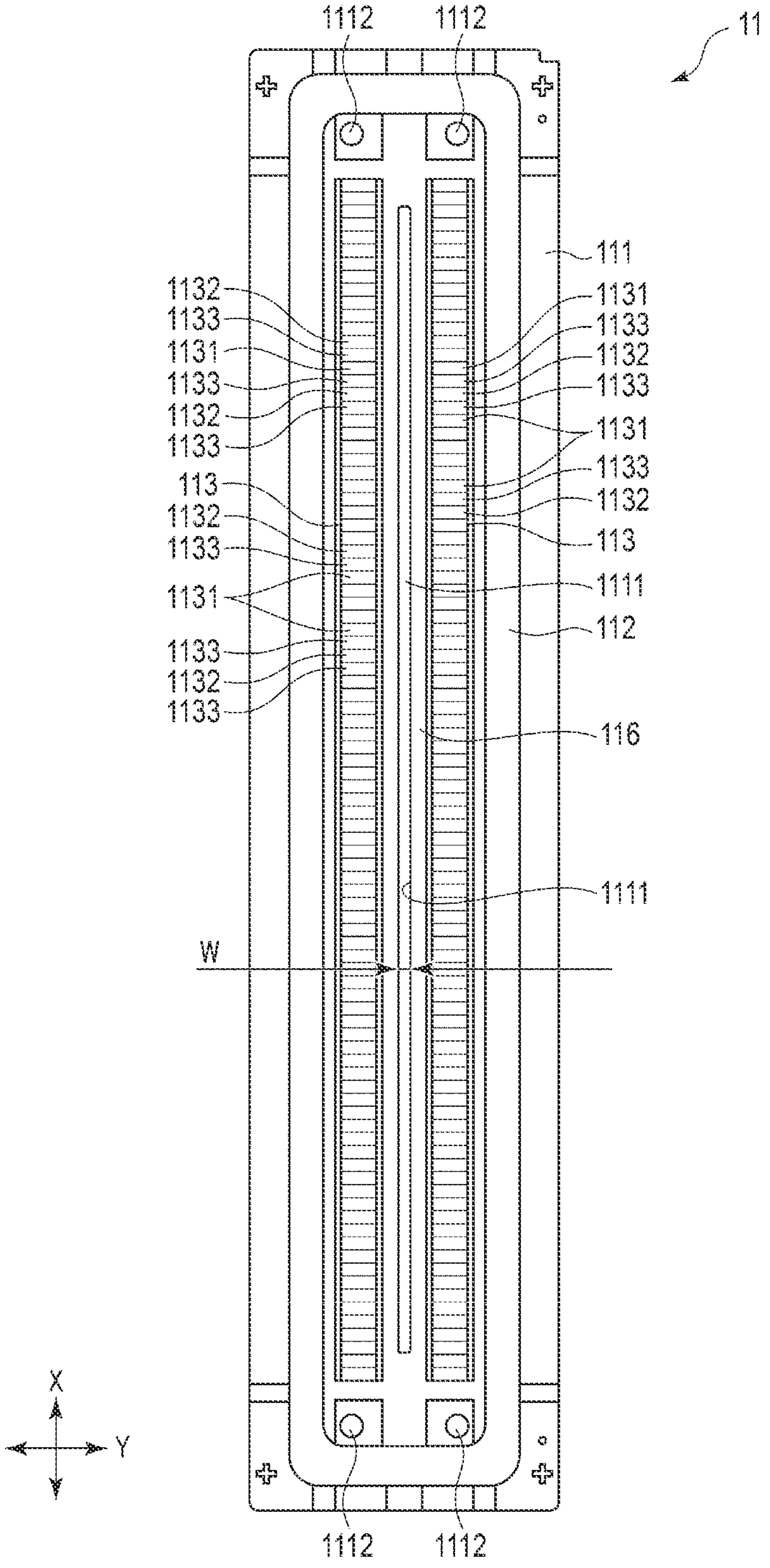
FIG. 8 is a bottom view of a head body with a part thereof omitted.
Figure 9:
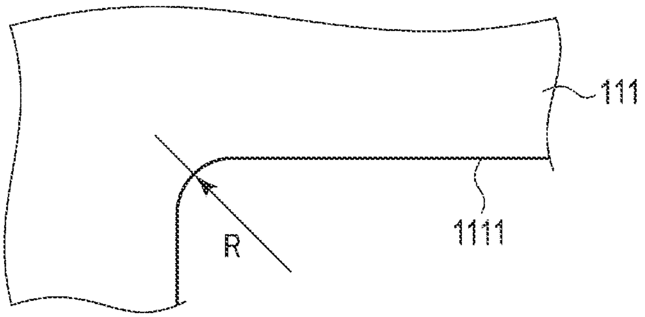
FIG. 9 is an enlarged view of a portion of a base plate.
Figure 10:
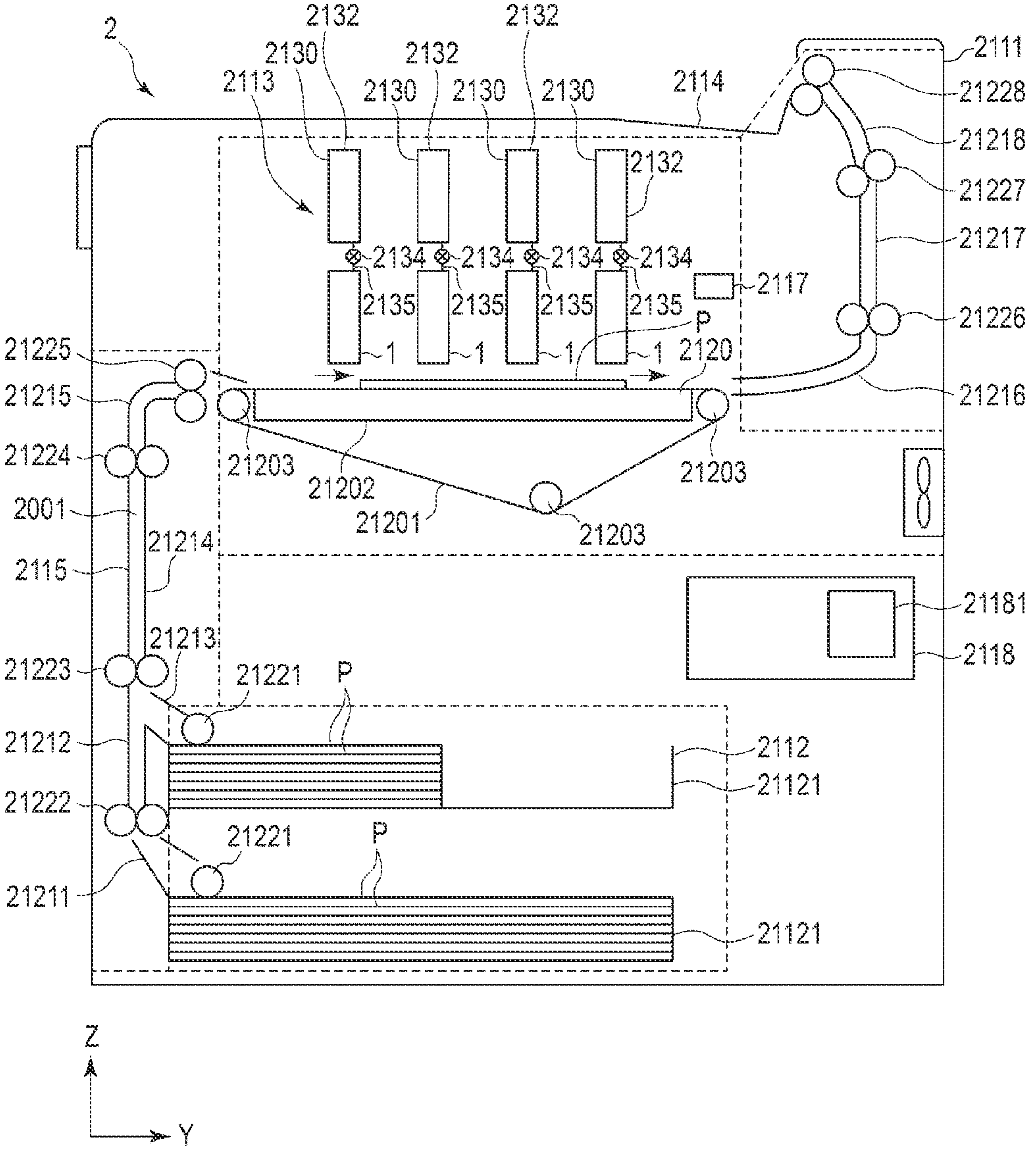
FIG. 10 depicts a liquid discharge device according to an embodiment.

FIG. 4 is an enlarged cross-sectional view of a head body 11 and a manifold unit 12 of the liquid discharge head 1. FIG. 5 is a bottom view of the head body 11 with nozzle plates 114 omitted. FIG. 6 is a perspective view of a base plate 111 showing a flow of liquid by arrows. FIG. 7 is a perspective view of the base plate 111 at a cross section along a line VII-VII in FIG. 6 showing a flow of liquid by arrows. FIG. 8 is a bottom view showing an example in which the nozzle plates 114 of the head body are omitted and a shape of an end portion of a supply port 1111 is different from that of the base plate 111 in FIG. 5. FIG. 9 is an enlarged view showing a corner portion of the supply port 1111 in the base plate 111. FIG. 10 is a diagram showing a configuration of the liquid discharge device 2 using the liquid discharge head 1.

In FIGS. 1 to 10, an X axis, a Y axis, and a Z axis orthogonal to each other are shown. In the following description, a direction along the X axis is referred to as a first direction X, a direction along the Y axis is referred to as a second direction Y, and a direction along the Z axis is referred to as a third direction Z. In the drawings, configurations, aspects, components, or the like may be enlarged, reduced, or omitted as appropriate for the sake of description.

The liquid discharge head 1 is, for example, an inkjet head in the liquid discharge device 2 such as an inkjet recording device shown in FIG. 10. The liquid discharge head 1 is provided in a head unit 2130 including a supply tank 2132 as a liquid storage portion in the liquid discharge device 2.

The liquid discharge head 1 is supplied with ink from the supply tank 2132. The liquid discharge head 1 may be a non-circulation head that does not circulate the ink, or may be a circulation head that circulates the ink. In the present embodiment, the liquid discharge head 1 is described using a non-circulation head as an example.

As shown in FIGS. 1 to 3, the liquid discharge head 1 includes a head body 11, the manifold unit 12, and a circuit board 13. For example, the liquid discharge head 1 is shear mode shared-wall side-shooter type four-row integrated structure head having two sets of head bodies 11 each having a pair of actuators 113.

The head body 11 discharges liquid. As shown in FIGS. 1 to 5 and 8, the head body 11 includes base plates 111, frame bodies 112, the actuators 113, the nozzle plates 114, and a mask plate 115. The head body 11 includes a common liquid chamber 116. The present embodiment will be described using an example of one head body 11 having two actuators 113. In the head body 11 shown in FIGS. 5 and 8, the nozzle plates 114 and the mask plate 115 are omitted.

As shown in FIGS. 5 to 8, the base plate 111 is formed of, for example, a ceramic material in a rectangular plate shape. The base plate 111 is formed in, for example, a rectangular shape that is elongated in the first direction X). The base plate 111 has one supply port 1111 and one or a plurality of discharge ports 1112. As shown in FIGS. 5 and 8, the base plate 111 is provided with the pair of actuators 113, and has a wiring pattern for driving the actuators 113. The supply port 1111 and the discharge ports 1112 are through holes that penetrate the base plate 111. For example, the supply port 1111 and the discharge ports 1112 are formed by cutting.

For example, the supply port 1111 is provided at a position aligned to the common liquid chamber 116. The supply port 1111 is an elongated hole (slot) extending in the first direction X between a pair of the actuators 113. The supply port 1111 receives ink to supply liquid to a position between the pair of actuators 113. FIG. 6 shows an example of supplying ink to the supply port 1111 as depicted by arrows. FIG. 7 shows an example of a flow of supplying ink from the supply port 1111 to the common liquid chamber 116 as depicted by arrows.

The supply port 1111 is, for example, an elongated hole having a rectangular shape of which each corner portion is formed to have a radius of curvature R. The supply port 1111 may also be an elongated hole having a uniform width with both ends being in a semicircular curved surface shape with a predetermined radius of curvature R. A length of the supply port 1111 in the longitudinal direction is set to be, for example, a length equal to or larger than the dimension of actuators 113 in the longitudinal direction or less than the length of the actuator 113 but within a range approximately equal to the range in which pressure chambers 1131 formed in the actuator 113 are actively driven during normal ink discharge.

If a width of the supply port 1111 in a short direction is taken to W, the radius of curvature R) of the corner portions or the end portions) of the supply port 1111 shown in FIG. 9 is set to satisfy the relationship $W\times0.2\leq R\leq W\times0.5$.

For example, if the radius of curvature R is set to $R=W\times0.5$, the supply port 1111 is a semicircular elongated hole as shown in FIG. 5.

For example, if the radius of curvature R is set to $R<W\times0.5$, as shown in FIG. 8, the supply port 1111 is an elongated hole having a rectangular shape with four distinct corners (corner portions) that are curved or rounded surfaces.

In this context, the stated radius of curvature R should be considered to include an accuracy range limit or tolerance in consideration of processing accuracy and the like. For example, the accuracy range is 25%. That is, considering this accuracy range limit, the radius of curvature R can be considered to satisfy the relationship $W\times0.2\pm(W\times0.2\times0.25)\leq R\leq W\times0.5\pm(W\times0.5\times0.25)$.

In the example of the supply port 1111 in FIG. 5, if the width W of the supply port 1111 is W=0.55 mm, the radius of curvature R of the curved surface of the end portion of the supply port 1111 could be R=0.275 mm±0.069 mm.

A lower limit value ($W\times0.2\pm(W\times0.2\times0.25)$) of the radius of curvature R is, for example, the value at which a stress applied to the corner portion of the supply port 1111 can be relaxed and processing can be performed. An upper limit value ($W\times0.5\pm(W\times0.5\times0.25)$) of the radius of curvature R is a value at which the end portion of the supply port 1111 has a semicircular shape and processing can be performed. If the radius of curvature R is larger than the upper limit value, a outermost portion of the end portion of the supply port 1111 will be sharp or pointed, and thus a stress may concentrate at this position.

A plurality of discharge ports 1112 are provided, for example. Each of the discharge ports 1112 is provided, for example, in the base plate 111 at a position adjacent to at least one end of the actuator 113 in the longitudinal direction. In the example shown in FIG. 5, for example, four discharge ports 1112 are formed in the base plate 111.

As shown in FIG. 5, the frame bodies 112 are fixed to one main surface (one surface) of the base plate 111 via an adhesive or the like. The frame bodies 112 surround the supply port 1111, the plurality of discharge ports 1112, and the actuators 113 provided in the base plate 111.

For example, each of the frame bodies 112 is formed in a rectangular frame shape elongated in the first direction X, thereby forming an opening elongated along the longitudinal direction of the frame body 112. The pair of actuators 113, a supply port 1111, and two discharge ports 1112 are disposed in the opening of the frame body 112.

The actuator 113 is formed in a plate shape elongated in the first direction X. The pair of actuators 113 are bonded to the base plate 111. As shown in FIG. 5, a pair of actuators 113 are provided on the base plate 111 so as to be disposed side by side in two rows spaced in the second direction Y with the supply port 1111 interposed therebetween. The actuators 113 are disposed in the opening of the frame body 112 and bonded to the base plate 111. As a specific example, each of the actuators 113 is formed by bonding two rectangular plate-shaped piezoelectric materials such that polarization directions thereof are opposite to each other. Here, the piezoelectric material is, for example, lead zirconium titanate (PZT). The actuator 113 is bonded to the surface of the base plate 111 via, for example, a thermosetting epoxy adhesive.

The actuator 113 includes, for example, the plurality of pressure chambers 1131 and a plurality of air chambers 1132 alternately disposed at equal intervals in the first direction X. In the actuator 113, a plurality of grooves are formed on a main surface side opposite to a base plate 111 side, and the plurality of pressure chambers 1131 and the plurality of air chambers 1132 are formed by these grooves. In other words, the actuator 113 has a plurality of walls 1133 disposed at equal intervals in the longitudinal direction and forming grooves therebetween. In the plurality of grooves formed by the plurality of walls 1133, an inlet and outlet can be closed by a photosensitive resin material or the like between every other adjacent pair of walls, and the air chambers 1132 (dummy chambers) are thus provided. Accordingly, the plurality of air chambers 1132 are disposed alternately with the plurality of pressure chambers 1131. In such an actuator 113, by alternately arranging the pressure chambers 1131 and the air chambers 1132, the pressure chambers 1131 can be driven independently regardless of any adjacent driving of another pressure chamber 1131. The plurality of walls 1133 are piezoelectric bodies serving as driving elements that change volumes of the pressure chambers 1131 when a drive voltage is applied thereto.

A surface of the actuator 113 opposite to the base plate 111 is bonded to a nozzle plate 114. In the actuator 113, a wiring pattern for driving the plurality of pressure chambers 1131 is formed.

As shown in FIGS. 2 and 3, the nozzle plate 114 is formed in a plate shape. The nozzle plate 114 is fixed to the frame body 112 opposite to the base plate 111 via an adhesive or the like. The nozzle plate 114 includes a plurality of nozzles 1141 formed at positions facing the plurality of pressure chambers 1131 when assembled. In the present embodiment, the nozzle plate 114 has two nozzle rows 1142 in which the plurality of nozzles 1141 are disposed side by side along the first direction X.

The plurality of nozzles 1141 are holes for ejecting ink during an operation by the liquid discharge head 1, such as printing.

The mask plate 115 covers, for example, a portion of the surface of the nozzle plate 114 on an outer surface side, an outer peripheral edge of the nozzle plate 114, an outer peripheral edge of the frame body 112, and an outer peripheral edge of the base plate 111. The mask plate 115 also covers a first manifold 1213 of the manifold unit 12.

As shown in FIGS. 2 and 3, the mask plate 115 has a pair of windows 1151 for exposing the nozzle rows 1142 of a pair of nozzle plates 114.

As shown in FIGS. 5 and 8, the common liquid chamber 116 is a space formed by the base plate 111, the frame body 112, the actuator 113, and the nozzle plate 114. The common liquid chamber 116 connects to the supply port 1111 and thus fills with ink during operations. The common liquid chamber 116 is provided around the pair of actuators 113. Specifically, the common liquid chamber 116 communicates with both the inlets and outlets of the plurality of pressure chambers 1131. The common liquid chamber 116 also connects to the discharge ports 1112.

As shown in FIGS. 1, 2, and 4, the manifold unit 12 includes a manifold 121, top plates 122, ink supply pipes 123, ink discharge pipes 124, and dampers 127. The number of the ink supply pipes 123 and the number of the ink discharge pipes 124 can be set as appropriate.

The manifold 121 is formed in a plate shape or in a block shape. The manifold 121 forms a supply path that is continuous with the supply port 1111 in the base plate 111 and thus forms a liquid supply flow path. The manifold 121 also forms a discharge path that is continuous with the discharge port 1112 in the base plate 111 and thus forms a liquid discharge path. Since the manifold 121 is connected to the pair of head bodies 11 in this example, the manifold 121 has a pair of supply paths and a pair of discharge paths. The supply path and the discharge path are ink flow paths formed by holes and/or grooves. The supply path fluidly connects the ink supply pipes 123 and the supply port 1111 in the base plate 111.

One surface of the manifold 121 is fixed to the surface of the base plate 111. The top plates 122 are fixed to a surface of the manifold 121 opposite the side to which the base plate 111 is fixed. The ink supply pipe 123 and the ink discharge pipe 124 are fixed to the manifold 121 via, for example, the top plate 122. The discharge path fluidly connects the ink discharge pipes 124 and the plurality of discharge ports 1112 in the base plate 111.

The manifold 121 includes, in this example, a first manifold 1213 and a second manifold 1214. The manifold 121 is formed by assembling the first manifold 1213 and the second manifold 1214.

The first manifold 1213 is formed in a rectangular plate shape. In the first manifold 1213, a groove and an opening constituting a part of the pair of supply paths and a part of the pair of discharge paths are formed. The arrangement, size, and the like of the groove and the opening constituting a part of the supply paths and the discharge paths can be set as appropriate based on shapes of the supply paths and the discharge paths and a shape of another fluid flow path.

In the present embodiment, as shown in FIG. 2, a pair of first openings 12131 forming a part of the supply paths and a pair of second openings 12132 forming a part of the discharge paths are formed in the first manifold 1213.

The second manifold 1214 is formed in a rectangular plate shape. In the second manifold 1214, a groove and an opening constituting a part of the pair of supply paths and a part of the pair of discharge paths are formed. The arrangement, size, and the like of the groove and the opening constituting a part of the supply paths and the discharge paths are set as appropriate based on shapes of the supply paths and the discharge paths and a shape of the fluid flow path.

In the present embodiment, as shown in FIG. 2, a pair of third openings 12141 forming a part of the supply paths and a pair of fourth openings 12142 forming a part of the discharge paths are formed in the second manifold 1214.

The second manifold 1214 serves to fix the liquid discharge head 1 inside the liquid discharge device 2, and also serves as a datum plate that defines a position of the head body 11. As a specific example, as shown in FIGS. 1 and 2, the second manifold 1214 includes a pair of flange portions 12147 formed at both ends in the longitudinal direction (first direction X). In the flange portion 12147, a datum hole 12148 for fixing and positioning the liquid discharge head 1 is formed.

Such a first manifold 1213 and such a second manifold 1214 are bonded to one another to form the supply paths and the discharge paths.

The top plate 122 is provided on a surface of the manifold 121 opposite to the surface on which the base plate 111 is provided, in other words, a surface of the second manifold 1214 opposite to a surface on which the first manifold 1213 is provided. The top plate 122 has openings through which the ink supply pipes 123 and the ink discharge pipes 124 communicate with the supply paths and the discharge paths of the manifold 121.

The ink supply pipe 123 is connected to the supply path. The ink discharge pipe 124 is connected to the discharge path. In the present embodiment, the liquid discharge head 1 includes the pair of head bodies 11, and thus a pair of ink supply pipes 123 and a pair of ink discharge pipes 124 are provided.

The damper 127 is an elastically deformable thin film or an elastically deformable sheet. As shown in FIGS. 2 and 4, the damper 127 covers the third openings 12141 forming a part of supply paths formed in the second manifold 1214. The damper 127 is elastically deformed according to a pressure fluctuation on the supply path. A lower surface of the damper 127 faces the supply path. For example, the damper 127 is formed of a polyimide film.

As shown in FIGS. 1 and 2, one end of the circuit board 13 is connected to the wiring pattern of the actuator 113 through the wiring pattern on the base plate 111. The circuit board 13 includes, for example, a wiring film, a driver IC mounted on the wiring film, and a printed wiring base plate mounted on the wiring film.

The circuit board 13 drives the actuator 113 by applying a drive voltage to the wiring pattern of the actuator 113 by the driver IC, and increases or decreases the volumes of the pressure chambers 1131 to discharge liquid droplets from the nozzles 1141.

For example, a plurality of wiring films are provided. The wiring film is, for example, a chip on film (COF) on which the driver IC is mounted. The driver IC is electrically connected to a wiring pattern formed in the pressure chambers 1131. The printed wiring base plate can be a printing wiring assembly (PWA) on which various electronic components and connectors are mounted.

The liquid discharge head 1 is attached to an inkjet recording device, such as the liquid discharge device 2 shown in FIG. 10, via the second manifold 1214 (also serving as a datum plate). Hereinafter, the liquid discharge device 2 will be referred to as a inkjet recording device 2. The liquid discharge head 1 is connected to the supply tank 2132 in the inkjet recording device 2. The liquid discharge head 1 can be a circulation head that recirculates ink between the liquid discharge head 1 and the supply tank 2132. In other examples, the liquid discharge head 1 can be a non-circulation head that is supplied with ink from the supply tank 2132 but discharges ink to a maintenance device 2117 during a maintenance operation. The liquid discharge head 1 is disposed in a posture in which the nozzles 1141 in the nozzle plate 114 of the head body 11 face downward.

Hereinafter, the inkjet recording device 2 including the liquid discharge head 1 will be described with reference to FIG. 10. The inkjet recording device 2 includes a housing 2111, a medium supply unit 2112, an image forming unit 2113, a medium discharge unit 2114, a conveyance device 2115 that is a support device, the maintenance device 2117, and a control unit 2118.

The inkjet recording device 2 is an inkjet printer in which liquid such as ink is discharged while conveying a sheet P as a recording medium along a predetermined conveyance path 2001 from the medium supply unit 2112 to the medium discharge unit 2114 passing through the image forming unit 2113 for forming an image on the sheet P.

The medium supply unit 2112 includes a plurality of sheet feeding cassettes 21121. The image forming unit 2113 includes a support portion 2120 that supports a sheet and a plurality of head units 2130 that are disposed above the support portion 2120 so as to face the support portion 2120. The medium discharge unit 2114 includes a sheet discharge tray 21141.

The support portion 2120 includes a conveyance belt 21201 in a loop shape in a predetermined region where an image is formed, a support plate 21202 that supports the conveyance belt 21201 from a rear side, and a plurality of belt rollers 21203 provided on a rear side of the conveyance belt 21201.

The head unit 2130 includes a plurality of liquid discharge heads 1 that are inkjet heads, a plurality of supply tanks 2132 that are liquid tanks (liquid supply sources) mounted on or connected to the liquid discharge heads 1, pumps 2134 that supply ink, and connection flow paths 2135 that connect the liquid discharge heads 1 and the supply tanks 2132.

In the present embodiment, liquid discharge heads 1 for four colors of cyan, magenta, yellow, and black are included, and the supply tanks 2132 for these four colors are included. The supply tanks 2132 are connected to the respective liquid discharge heads 1 via the connection flow paths 2135.

Each of the pumps 2134 is, for example, a liquid feed pump implemented as a piezoelectric pump. The pump 2134 is connected to the control unit 2118 and is driven and controlled by the control unit 2118.

Each of the connection flow paths 2135 includes a supply flow path connected to the ink supply pipe 123 for the liquid discharge head 1. The connection flow path 2135 includes a collection flow path connected to the ink discharge pipe 124 for the liquid discharge head 1. For example, since the liquid discharge head 1 is of a non-circulation type in this present example, the collection flow path is connected to the maintenance device 2117. When the liquid discharge head 1 is of a circulation type, the collection flow path is connected to the supply tank 2132.

The conveyance device 2115 conveys the sheet P along the conveyance path 2001 from one of the sheet feeding cassettes 21121 to the sheet discharge tray 21141 through the image forming unit 2113. The conveyance device 2115 includes a plurality of guide plate pairs 21211, 21212, 21213, 21214, 21215, 21216, 21217, and 21218 and a plurality of conveyance rollers 21221, 21222, 21223, 21224, 21225, 21226, 21227, and 21228 disposed along the conveyance path 2001. The conveyance device 2115 supports the sheet P to be movable relative to the liquid discharge head 1.

The maintenance device 2117 suctions and collects the ink remaining on an outer surface of the nozzle plate 114 during maintenance. If the liquid discharge head 1 is of a non-circulation type, the maintenance device 2117 collects ink in the head body 11 from the nozzles 1141 during maintenance. Such a maintenance device 2117 generally includes a tray, a tank, or the like for storing the collected ink.

The control unit 2118 includes a CPU 21181 as an example of a processor, a memory such as a read only memory (ROM) that stores various programs and the like and a random access memory (RAM) that temporarily stores various types of variable data, image data, and the like, and an interface unit that receives data from an outside and outputs data to the outside.

Figure 11:
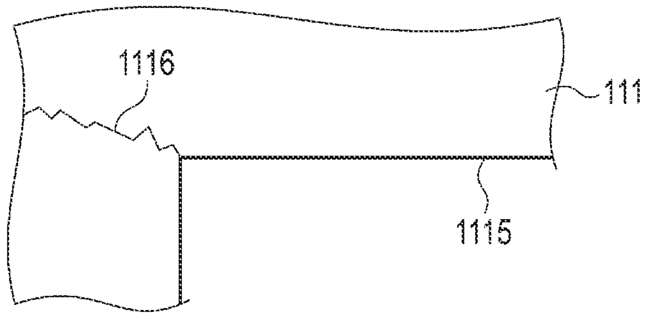
FIG. 11 is an enlarged view of a portion of a base plate according to a comparative example.

According to the liquid discharge head 1 and the liquid discharge device 2, the supply port 1111 in the base plate 111 is formed as an elongated hole having a rectangular shape with rounded corner portions or as an elongated hole with rounded ends (e.g., semicircle ends). Accordingly, concentration of a stress at a corner portion of the supply port 1111 can be prevented. That is, unlike a supply port 1115 in the base plate 111 in a comparative example shown in FIG. 11 without a rounded corner portion, a stress may be concentrated at the sharp corner portion of the supply port 1115, and a crack 1116 may occur in the base plate 111 if a force is applied from an outside of the base plate 111 or when a temperature of one actuator 113 becomes high and a high temperature is differentially applied to the base plate 111. In contrast, if the corner portion of the supply port 1111 is formed in a curved surface (rounded) shape or the end portion of the supply port 1111 is a curved surface shape such as a semicircular shape, the stress does not concentrate a singular point, and thus it is possible to prevent occurrence of a crack in the base plate 111.

Since the supply port 1111 is an elongated hole or slot, it is possible to supply a large amount of ink at a high speed.

According to the liquid discharge head 1 and the liquid discharge device 2 according to an embodiment described above, damage to the base plate 111 can be reduced.

In an embodiment, the liquid discharge head 1 and the liquid discharge device 2 are used in a recording device that discharges ink, but the disclosure is not limited thereto. That is, the liquid discharge head 1 and the liquid discharge device 2 can also be, for example, a 3D printer, an industrial manufacturing machine, a medical research apparatus or the like.

In an embodiment, the actuator 113 of the liquid discharge head 1 includes a plurality of pressure chambers 1131 and a plurality of air chambers 1132 alternately disposed with the pressure chambers 1131, but the configuration is not limited to this. For example, the actuator 113 need not include the plurality of air chambers 1132 in all examples.

According to at least one embodiment described above, with the liquid discharge head and the liquid discharge device, damage to the base plate can be reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A liquid discharge head, comprising:

a base plate having an elongated hole therein, the elongated hole extending lengthwise in a first direction and laterally in a second direction perpendicular to the first direction, a corner portion of the elongated hole proximate to an end of the elongated hole in the first direction being rounded; and a first piezoelectric actuator on the base plate at a position adjacent to the elongated hole in the second direction, the first piezoelectric actuator including a plurality of pressure chambers disposed along the first direction, wherein, when a width of the elongated hole in the second direction is a value W, the radius of curvature R of the corner portion satisfies the relationship:

$W\times0.2\pm(W\times0.2\times0.25)\leq R\leq W\times0.5\pm(W\times0.5\times0.25)$.

2. The liquid discharge head according to claim 1, wherein the radius of curvature R of the corner portion satisfies the relationship $W\times0.2\leq R\leq W\times0.5$.

3. The liquid discharge head according to claim 1, wherein the first piezoelectric actuator includes a plurality of air chambers disposed alternately with the plurality of pressure chambers.

4. The liquid discharge head according to claim 1, further comprising:

a second piezoelectric actuator on the base plate at a position adjacent to the elongated hole in the second direction, the elongated hole being between the first piezoelectric actuator and the second piezoelectric actuator in the second direction, the second piezoelectric actuator including a plurality of pressure chambers disposed along the first direction.

5. The liquid discharge head according to claim 4, wherein the elongated hole is a supply port through which liquid is supplied to the plurality of pressure chambers of the first and second piezoelectric actuators.

6. The liquid discharge head according to claim 1, wherein the end of the elongated hole is semicircular.

7. A liquid discharge device, comprising:

a liquid supply source; and a liquid discharge head including:

a base plate having an elongated hole therein, the elongated hole extending lengthwise in a first direction and laterally in a second direction perpendicular to the first direction, a corner portion of the elongated hole proximate to an end of the elongated hole in the first direction being rounded; and a first piezoelectric actuator on the base plate at a position adjacent to the elongated hole in the second direction, the first piezoelectric actuator including a plurality of pressure chambers disposed along the first direction, wherein the elongated hole is fluidly connected to the liquid supply source, and when a width of the elongated hole in second direction is a value W, the radius of curvature R of the corner portion satisfies the relationship:

$W\times0.2\pm(W\times0.2\times0.25)\leq R\leq W\times0.5\pm(W\times0.5\times0.25)$.

8. The liquid discharge device according to claim 7, wherein the radius of curvature R of the corner portion satisfies the relationship $W\times0.2\leq R\leq W\times0.5$.

9. The liquid discharge device according to claim 7, further comprising:

a second piezoelectric actuator on the base plate at a position adjacent to the elongated hole in the second direction, the elongated hole being between the first piezoelectric actuator and the second piezoelectric actuator in the second direction, the second piezoelectric actuator including a plurality of pressure chambers disposed along the first direction.

10. The liquid discharge device according to claim 9, wherein the elongated hole is a supply port through which liquid is supplied to the plurality of pressure chambers of the first and second piezoelectric actuators.

11. The liquid discharge device according to claim 7, wherein the end of the elongated hole is semicircular.

12. The liquid discharge device according to claim 7, further comprising:

a sheet conveyance unit configured to convey a sheet to a position facing the liquid discharge head.

13. The liquid discharge device according to claim 7, wherein the first piezoelectric actuator includes a plurality of air chambers disposed alternately with the plurality of pressure chambers.

* * * * *